United States Patent [19]

Rizzo

[11] 4,181,283
[45] Jan. 1, 1980

[54] ROTARY MOUNT CHARACTERIZED BY VARIABLE CONING MOTION

[75] Inventor: Anthony A. Rizzo, Torrance, Calif.

[73] Assignee: TRW Inc. Systems & Energy, Redondo Beach, Calif.

[21] Appl. No.: 879,170

[22] Filed: Feb. 21, 1978

[51] Int. Cl.² .......................................... F16M 13/00
[52] U.S. Cl. .................................. 248/550; 343/759; 343/765; 82/1.4
[58] Field of Search ................... 248/1, 178, 179, 183, 248/186; 90/20; 343/758, 759, 765, 766

[56] References Cited

U.S. PATENT DOCUMENTS

| 672,303 | 4/1901 | Williams | 248/23 |
| 2,574,376 | 11/1951 | Childs et al. | 343/759 |

*Primary Examiner*—William H. Schultz
*Attorney, Agent, or Firm*—John J. Connors; Donald R. Nyhagen

[57] ABSTRACT

A rotary mount for an object, such as an instrument or workpiece, has a base supporting a rotor which turns on a fixed axis relative to the base and rotatably supports, in turn, on a second rotation axis inclined to the fixed axis, a platform for supporting the object with a reference axis of the object inclined to the platform rotation axis. The rotor and platform are selectively rotatable individually and in unison in such a way as to angularly and rotatably displace the reference axis through a range of skew angles and directions relative to the fixed axis.

Operatively coupled between the base, rotor, and platform are drive means for selectively driving the rotor and platform individually and in unison and angle sensing means for generating signals representing the relative angular positions of the base, rotor and platform in such a way as to permit angular positioning or pointing of the object on the platform with high resolution and driving of the object in a conical, spiral, or the other coning motion.

16 Claims, 8 Drawing Figures

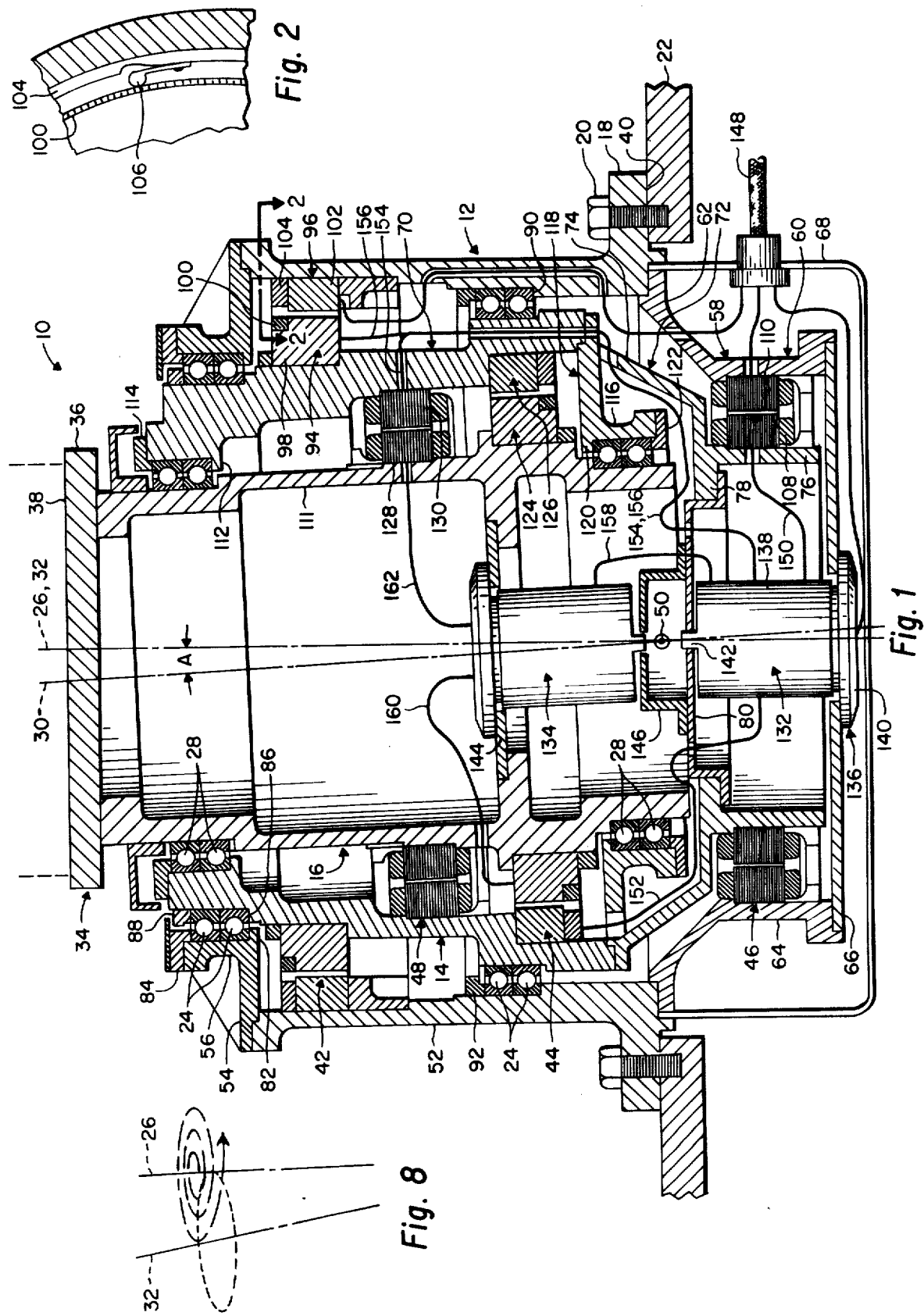

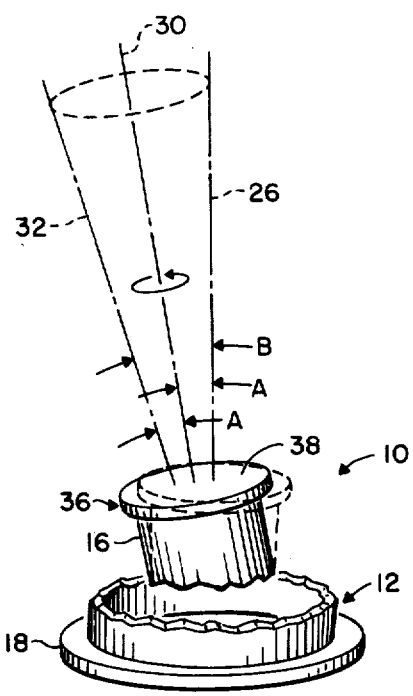
Fig. 3
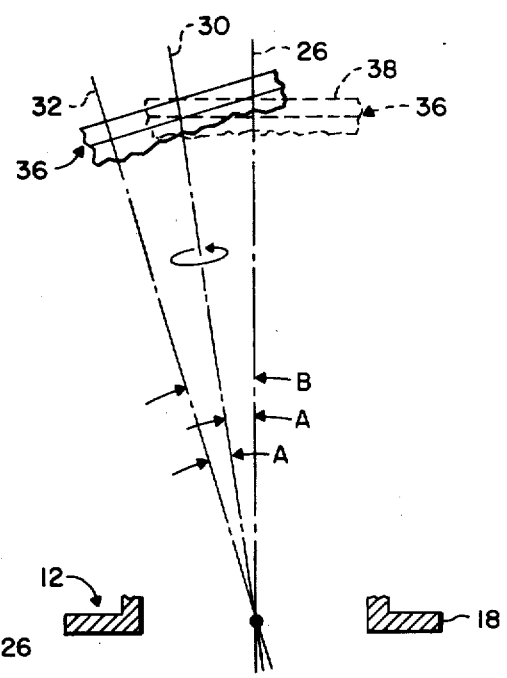
Fig. 4
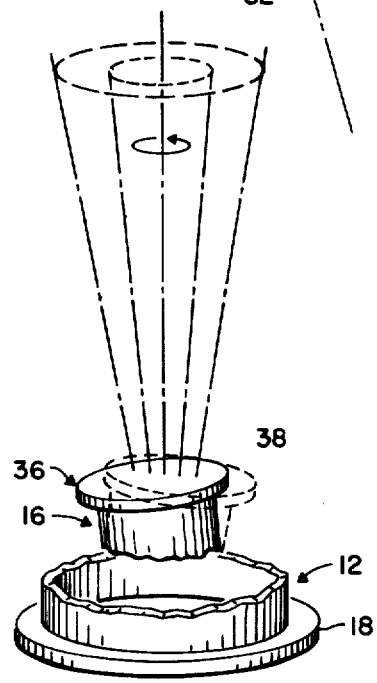
Fig. 5
Fig. 6
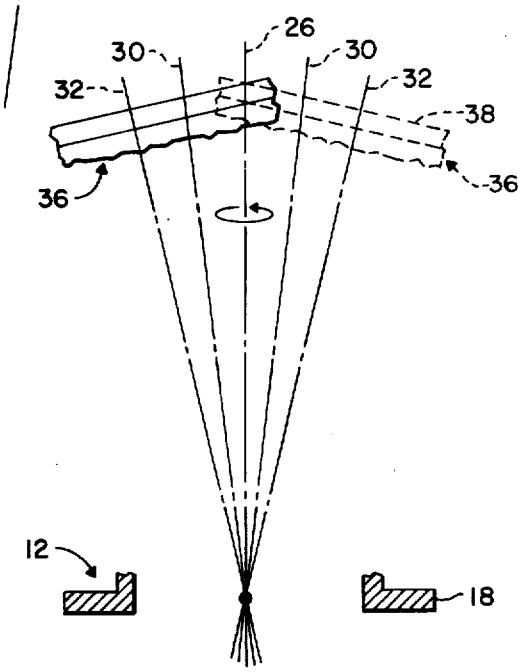
Fig. 7

ROTARY MOUNT CHARACTERIZED BY VARIABLE CONING MOTION

BACKGROUND OF THE INVENTION

1. Field

This invention relates generally to a movable mount for an object such as an instrument or workpiece and more particularly to a high resolution rotary mount for positioning, pointing, and moving the object with a variable coning motion.

2. Prior Art

Simply stated, this invention provides a turntable-like supporting device, referred to herein as a "mount," having a platform for supporting an object and means for moving the platform in such a way as to effect rotary and angular positioning or pointing of the object or rotary driving of the object with a coning motion. Mounts of this kind are susceptible of a variety of applications. Typical applications are pointing and scanning of optical sensors, lasers, cameras, antennas and other devices having a critical axis. Other applications involve positioning of tools and work parts in machine tools and the like.

The prior art is replete with a vast assortment of mounts of the general class described. Examples of such mounts are described in U.S. Pat. Nos. 2,294,437; 2,574,376; 3,584,534; to mention only a very few of the many patents in this field.

While these existing mounts are satisfactory to some degree, they are characterized by certain inherent deficiencies which detract from their practicality. Foremost among these deficiencies are complexity, high cost, large mass, and, in many cases, relatively low resolution and positioning/scanning accuracy. Moreover, many of the existing mounts have only limited positioning and scanning adjustment capability.

SUMMARY OF THE INVENTION

This invention provides an improved high resolution rotary positioning and coning mount of the class described. The mount avoids most if not all of the deficiencies of the existing mounts of this character and permits selective positioning or pointing of an object on the mount and scanning movement of the object with a conical, spiral or other prescribed coning motion.

The rotary mount of the invention has a relatively stationary base for attachment to a support, a rotor mounted on the base to turn on a first rotation axis, referred to herein as a fixed axis, relative to the base and a platform rotatably mounted on the rotor on a second rotation axis inclined relative to the fixed axis. The platform is adapted to mount an object with a reference axis of the object inclined relative to the platform rotation axis. The rotor and platform are selectively rotatable individually and in unison in a manner to angularly displace the reference axes through a range of skew angles and directions relative to the fixed axis.

Operatively coupled between the base and rotor and between the rotor and platform are drive means for selectively driving the rotor and platform in rotation. Also coupled between the base, rotor, and platform are angle sensing means for generating signals representing the relative angles of the base and rotor and of the rotor and platform. These drive and sensing means are operable to selectively position the platform and object to locate the object reference axis at any skew angle within the range of the mount and in any skew direction relative to the fixed axis of the mount, and to drive the platform and object in a conical, spiral, or other prescribed coning motion.

In a typical application of the mount, an instrument such as an optical sensor, laser, camera, antenna or the like is fixed to the platform with a reference axis of the instrument inclined to the platform rotation axis. The drive means and angle sensing means are operated to selectively position or point the instrument, i.e., the instrument axis, in a desired direction or to drive the instrument in selected conical, spiral or other prescribed coning motion.

In the presently preferred embodiment described, the base, rotor and platform of the mount are annular in cross section and assembled in interfitting relation with the platform disposed within the rotor and both the rotor and platform disposed within the base so as to form a very compact unit. The rotary drive means comprise electrical motors which and the angle sensing means have annular rotor and stator elements mounted between concentric wall portions of the base, rotor and platform. The platform has an object mounting surface in a plane inclined to the platform rotation axis.

BRIEF DESCRIPTION OF THE DRAWING

FIG. 1 is an axial cross section through a rotary mount according to the invention;

FIG. 2 is an enlarged section taken on line 2—2 in FIG. 1;

FIGS. 3–8 are semi-diagrammatic illustrations of the mount illustrating its variable coning motion.

DESCRIPTION OF THE PREFERRED EMBODIMENTS

As noted above, a high resolution rotary positioning and coning mount according to the invention has a base rotatably supporting a rotor which turns on a first "fixed" axis relative to the base and rotatably supports, in turn, a platform for rotation relative to the rotor on a second axis inclined to the fixed axis. The platform has means for mounting an object to be positioned or driven with a rotary coning motion.

Operatively coupled between the base and rotor and between the rotor and the platform are drive means for selectively driving the rotor and platform in rotation individually and in unison relative to the base, and angle sensing or indicating means for generating angle signals representing the angular position of the rotor relative to the base and the angular position of the platform relative to the rotor. These drive means and sensing means are operable to selectively position the platform and hence an object on the platform in such a way as to locate a reference axis of the object at any selected skew angle in any selected skew direction relative to the fixed axis of the mount and to drive the platform in a manner to cause the reference axis to undergo a conical, spiral or other prescribed coning motion.

The drawings illustrate a presently preferred rotary positioning and coning mount 10 according to the invention. This mount has a base 12, rotor 14, and platform 16 of annular cross section and disposed in interfitting relation. Base 12 has a mounting flange 18 secured by bolts 20 to a support 22. Rotor 14 is rotatably supported by bearings 24 within the base 12 to turn on an axis 26 relative to the base. This axis is referred to herein as a "fixed" axis. Platform 16 is rotatably supported by bearings 28 within the rotor 14 to turn on an axis 30 relative to the rotor. Axis 30 is inclined at an angle A relative to and intersects the fixed axis 26.

Platform 16 has a reference axis 32 inclined to the platform rotation axis 30 and means 34 for mounting an object on the platform in fixed relation to the reference axis. In the preferred embodiment shown, the platform reference axis 32 is an axis which coincides with the fixed axis 26 in one angular position of the platform 16 relative to the base 12 and is thus inclined at the angle A to the platform rotation axis 30. The platform mounting means 34 comprises a mounting plate 36 having a surface 38 normal to the reference axis 32 for seating the object mounted on the platform. This seating surface parallels the seating surface 40 of the base flange 18 in the platform position in which the platform reference axis 32 coincides with the fixed axis 26.

Drive means 42 operatively couples the base 12 and rotor 14 for driving the rotor in rotation on its fixed rotation axis 26 relative to the base. Rotor 14 and platform 16 are operatively coupled by drive means 44 for driving the platform in rotation on its axis 30 relative to the rotor. Angle sensing or indicating means 46, 48 are also coupled between the base 12 and rotor 14 and between the rotor and the platform 16, respectively, to generate angle signals representing the angular position of the rotor relative to the base and angular position of the platform relative to the rotor.

From the description to this point, it will be understood that in any given angular position of the rotor 14 relative to the base 12, rotation of the platform 16 by its drive means 44 effectively drives the platform reference axis 32 in a coning motion about the axis intersection 50 and through a position of coincidence with the fixed axis 26. The coning angle of this motion is the maximum skew angle B discussed below. The platform seating surface 38 undergoes a wobble motion through a position parallel to the base flange seating surface 40.

During this platform rotation, its reference axis 32 effectively oscillates about the intersection 50 back and forth toward and away from the fixed axis 26 in a plane containing these two axes, as shown in FIGS. 3 and 4. This oscillation occurs through an angle B, referred to herein as a skew angle, and between a first limit wherein this skew angle is zero and the reference axes coincides with the fixed axis, and a second limit wherein the skew angle is maximum and equals twice the angle A between the axes 26, 30.

In any fixed angular position of the platform 16 relative to the rotor 14 other than a position in which the skew angle B is zero, rotation of the rotor relative to the base 12 again drives the platform reference axis 32 in a coning motion about the axis intersection 50. In this case, however, the coning motion is symmetrical about the fixed axis 26 and the coning angle of the motion is the skew angle B corresponding to the angular position of the platform relative to the rotor. This coning angle may be varied by rotatably adjusting the platform relative to the rotor about the axis 26.

The platform seating surface 38 undergoes a wobble motion as before. This wobble motion is also symmetrical about the fixed axis 26 and is adjustable in magnitude by angular adjustment of the platform 16 relative to the rotor 14. Angular adjustment of the platform to a zero skew angle B, of course, places the platform reference axis 32 in coincidence with the fixed axis 26 and the platform seating surface normal to the fixed axis and parallel to the base flange seating surface 40. Under these conditions, the platform seating surface rotates in its plane without a wobble motion.

Assume now that both the rotor 14 and platform 16 are driven in rotation. This combined rotation may occur in such a way as to drive the platform reference axis 32 in a wide range of coning motions, such as a pure conical motion or a conical spiral motion.

In actual use of the mount 10, an object to be angularly positioned or driven in a prescribed scanning motion is fixed to the platform mounting plate 36 with a selected axis of the object aligned with the platform reference axis 32. Either the rotor 14 or the platform 16 may be rotated by itself or both may be rotated in unison in such a way as to angularly position the object or drive the object in a prescribed coning motion. For example, the object may be an instrument, such as a sensor, laser, antenna or the like, having a critical or sensitive axis which may be pointed in a selected direction or driven in a desired scanning motion by appropriate rotation of either or both the rotor and platform. Alternatively, the object may be a workpiece to be positioned or driven in a prescribed coning motion for machining purposes.

Referring in more detail to the drawings, the base 12 of the mount 10 has an annular shape including a generally cylindrical wall 52 whose lower end turns outwardly to form the base flange 18. Secured to the upper end of the cylindrical base wall 52 is a ring 54 which projects radially in from the wall and has an upstanding cylindrical flange 56 about its inner perimeter. Secured to the lower end of and protruding below the base wall 52 is a cup-like end member 58. This end member has an annular wall 60 with an upper conical portion 62 which joins the lower end of the annular base wall 52 and a lower cylindrical portion 64. An end plate 66 spans the lower end of the wall 60. A sealing cup 68 is secured to the lower end of the base wall 52 in surrounding relation to the end member 58 to seal the lower end of the base.

Rotor 14 is concentrically disposed within the base 12 and has an annular wall 70 whose outer surface concentric with and spaced radially from the cylindrical base wall 52. Rotor wall 70 is reduced in diameter in steps toward its upper end and has its upper, small diameter end disposed within the upper base ring flange 56. An annular wall 72 is secured to the lower end of the wall 70 and projects downwardly into the base end member 58. Wall 72 has an upper conical portion 74 joined to the wall 70 and a lower cylindrical portion 76 concentrically disposed within the lower cylindrical portion 64 of the base end member 58. Spanning the interior of the wall 70 at the juncture of its conical and cylindrical wall portions 62, 64 and secured to an internal wall flange 78 at this juncture is a cup-like end plate 80.

The upper rotor support bearings 24 comprise two ball bearing units disposed between the upper end of the rotor and the surrounding flange 56 of the upper base ring 54. The outer bearing races are confined between an internal shoulder 82 on the ring flange and a retaining ring 84 secured to the upper end of the flange. The inner bearing races are confined between an external shoulder 86 on the rotor 14 and a retaining ring 88 secured to the rotor.

The lower rotor support bearings 24 are two ball bearing units disposed between the annular base wall 52 and annular rotor wall 70. The outer bearing races are confined between an internal annular shoulder 90 on the base wall 52 and a retainer ring 92 secured to this wall.

The inner bearing races engage one step surface of the rotor.

From this description, it will be understood that the bearings 24 support the rotor 14 concentrically within the base 12 for rotation of the rotor on the common axis of the base and rotor. This common axis is the fixed axis 26.

As mentioned earlier, the rotor 14 is driven in rotation on the fixed axis 26 relative to the base 12 by the drive means 42. Any suitable drive means for this purpose may be utilized in the mount. The drive means shown comprises an electrical torque motor having annular rotor and stator elements 94, 96. Rotor element 94 surrounds and is fixed to the rotor 14 between its support bearings 24 and comprises a motor winding 98 and commutator ring 100. Stator element 96 is fixed within the cylindrical base wall 52 in surrounding relation to the rotor element 94 and comprises a magnetic ring 102 and brush block 104 supporting brushes 106 (FIG. 2) engaging the commutator ring 100.

The angle sensing or indicating means 46 is disposed between the cylindrical portions 64, 76 of the lower base end wall 72 of the rotor 14 and provides an output signal representing the angular position of the rotor 14 relative to the base 12. Any suitable angle or position sensing or indicating means may be utilized, such as a resolver. This sensing means has annular rotor and stator elements 108, 110 secured to the lower rotor and base end wall portions 76, 64, respectively.

Rotary platform 16 has a generally cylindrical spindle disposed within the annular rotor 14. The upper end of this spindle projects through and above the upper end of the rotor. The mounting plate 36 is fixed to the upper end of the spindle sufficiently above the upper end of the rotor 14 that the plate is free to undergo its wobble motion referred to earlier. The lower end of the platform spindle 111 is located at the level of the lower plate 80 in the rotor 14.

Bearings 28 are ball bearing units which support the platform 16 on the rotor 14 for rotation relative to the latter rotor on the central axis of the platform. This central axis is the axis 30 which is inclined at the angle A relative to the fixed axis 26. The upper platform ball bearing units 28 are disposed between the upper ends of the rotor 14 and platform 16, approximately in the plane of the upper rotor bearings 24. The outer races of the upper bearings 28 are confined between an internal shoulder 112 on the rotor 14 and a retaining ring 114 secured to the upper end of this rotor. The inner bearing races are secured to the upper end of the platform spindle 111. The lower platform bearings 28 are disposed between the lower end of the platform 16 and the coaxial cylindrical flange 116 of an annular bearing support 118 secured to the lower end of the rotor 14, just above its lower annular end wall 72. The outer bearing races are confined between an internal shoulder 120 on the bearing support flange 116 and a bearing retainer 122 secured to the lower end of the flange.

The platform drive means 44 is an electrical torque motor like the torque motor 42 for the rotor 14 and is disposed between the member and the platform 16 just above the lower platform bearings 28. The annular "rotor" and "stator" elements 124, 126 of the motor 44 are secured to the platform and the rotor, respectively. As mentioned earlier, the motor drives the platform 16 in rotation on its axis 30 relative to the rotor 14.

Similarly, the platform angle sensing or indicating means 48 is a resolver inductosyn, or other angle sensing device like the angle sensor 46 for the rotor 14. Angle sensor 48 is disposed between the rotor and the platform 16 with the annular sensor elements 128, 130 fixed to the rotor and platform, respectively. The sensor produces an output signal representing the angle of the platform about its axis 30 relative to the rotor.

Electrical current is conducted to and from the torque motors 42, 44 and the angle sensors 46, 48, through slip ring assemblies 132, 134. These slip ring assemblies are conventional and need not be described in elaborate detail. Each assembly has an inner cylindrical core 136 and an outer cylindrical sleeve 138 surrounding the core. The sleeve carries a number of axially spaced contact brushes (not shown) which engage corresponding electrical slip rings (not shown) on the core. The core has an enlarged flange 140 beyond one end of the sleeve. The opposite end of the sleeve has projecting tongues 142.

Slip ring assembly 132 is disposed between the lower end plates 66, 80 of the base 12 and rotor 14 in coaxial alignment with the fixed axis 26. The flanged end of the assembly core 136 projects downwardly through an opening in the base end plate 66 and its flange 140 is fixed in any convenient way to the plate. The tongues 142 on the upper end of the assembly sleeve 138 engage in holes in the plate 80 to key the sleeve to the rotor for rotation with the latter.

Slip ring assembly 134 is coaxially aligned with the platform axis 30 and is disposed between the lower end plate 80 of the rotor 14 and a plate 144 spanning the interior of and secured to the platform 16. The flanged end of the assembly core 136 projects upwardly through a central opening in the platform plate 144 and its flange 140 is joined in any convenient way to the plate. The tongues 142 on the lower end of the assembly sleeve 138 engage rockably in holes in a bridge 146 sleeve 138 rigidly joined to the top side of the end plate 80. This keys the sleeve to the rotor 14 for rotation with tht latter while permitting the slip ring assembly 134 to undergo coning motion with the platform 16 relative to the rotor.

Electrical current flows to and from the rotary mount 10 through electrical leads 148. Certain of these leads connect to the outer stator elements 102, 110 of the rotor torque motor 42 and angle sensor 46. The remaining leads 148 connect to the slip rings on the inner core 136 of the lower slip ring assembly 132. Lead 150, 152, 154, 156 connect certain contact brushes on the outer sleeve 138 of assembly 132 to the inner rotor element 108 of the angle sensor 46, to the outer element 126 of the platform torque motor 44, to the outer element 130 of the platform angle sensor 48, and the inner element 94 of the rotor torque motor 42. Some of the remaining contact brushes of slip ring assembly 132 connect through leads 158 to the contact brushes of the upper slip ring assembly 134. Leads 160, 162 connect the corresponding slip rings of the upper assembly to the inner element 124 of the platform torque motor 44 and to the inner element 128 of the platform angle sensor 48. A sufficient number of circuit paths will be provided through the slip ring assemblies 132, 134 to conduct electrical power and signals to and from the instrument or other device mounted on the platform 16.

It will now be understood, therefore, that the leads 148 are connected through the slip ring assemblies 132, 134 to the torque motors 42, 44 and angle sensors 46, 48 of the rotary mount 10 in such a way that the rotor 14 and platform 16 are free to undergo rotational and coning motion without interference from any of the conductor leads.

Summarizing now the operation of the rotary mount 10, assume first that the rotor 14 is stationary. Energizing of the platform torque motor 44 then drives the platform 16 in rotation on its rotation axis 30, causing the platform reference axis 32 to undergo a coning motion about the axis intersection 50 and the platform seating surface 38 to undergo a wobble motion. FIGS. 3 and 4 depict these motions. The coning motion occurs in eccentric relation to the fixed axis 26 and through the extreme positions shown in FIG. 4. In the broken line position of FIG. 4, the platform seating surface 38 is normal to and the platform reference axis 32 coincides with the fixed axis 26. The solid line position of FIG. 4 is diametrically opposite the broken line position. In this solid line position, the seating surface and reference axis are disposed at an angle B=2A relative to the fixed axis where A is the skew angle of the platform rotation axis 30 relative to the fixed axis. This angle is also the coning angle of the coning motion. The coning motion described above is thus offset from or eccentric to the fixed axis 26. The direction of offset of this coning motion is adjustable through a full 360° about the fixed axis 36 by rotation of the rotor 14, as indicated in FIG. 5.

Assume next that the platform torque motor 44 is deenergized and the rotor torque motor 42 is energized. Under these conditions, the platform 16 remains stationary relative to the rotor 14 and the platform and rotor are driven in rotation in unison on the fixed axis 26 relative to the base 12. As before, the platform reference axis 32 undergoes a coning motion about the axis intersection 50 and the platform seating surface 38 undergoes a wobble motion. These motions are depicted in FIGS. 6 and 7. In contrast to the coning motion of FIGS. 3 and 4, that of FIGS. 6 and 7 is symmetrical about the fixed axis 26. The angle between the platform reference axis 32 and the fixed axis 26 is the skew angle B referred to earlier and may have any value between zero and 2A depending upon the angular position of the platform 16 relative to the rotor 14. The coning angle of this coning motion is twice this skew angle and hence may range from zero to 4A. Adjustment of the coning angle is depicted by the dotted and phantom lines in FIG. 6.

Other types of coning motions are achieved by simultaneous rotation of the rotor 14 and platform 16. For example, a spiral coning motion may be achieved by energizing the rotor torque motor 42 to drive the rotor 14 in rotation on the fixed axis 26 and simultaneously energizing the platform torque motor 44 to drive the platform 16 in rotation relative to the rotor on the platform axis 30 in timed relation to the rotor rotation and from an initial position in which the platform reference axis 32 coincides with the fixed axis 26. This relative rotation is timed in a manner such that the platform reference axis 32 traces out a spiral coning motion. An almost unlimited number of other coning motions are also possible by timed rotation, intermittent or continuous, of the rotor 14 and platform 16. These motions of the rotary mount may be used to position or point an object, of course, rather than driving the object in a continuous motion.

All of these various coning motions of the mount 10 are accomplished with the aid of a control system (not shown) for the rotor and platform torque motors 42, 44. This control system will receive rotor and platform angle data from the rotor and platform angle sensors 46, 48 and will be programmed to energize the torque motors in the proper fashion in response to this angle data to accomplish the desired coning motion.

As noted earlier, the rotary mount of the invention may be used for a variety of applications. Certain of these applications involve driving an instrument, such as a laser, sensor, antenna or the like in a selected scanning pattern. In this case, the instrument is mounted on the platform plate 36 with the axis of the instrument aligned with the platform reference axis. The coning motion of the platform 16 then drives the instrument in a corresponding conical scanning motion. The mount may also be used for a variety of other purposes, such as positioning a workpiece or tool element in a machine tool or driving the workpiece or tool element in a conical machining motion. A primary advantage of the mount resides in the fact that by making the angle between the platform rotation axis 30 and the reference axis 32 relatively small, a relatively large rotation of the platform 16 on its axis 30 will produce only a very small inclination or rotation of the reference axis 32 relative to the fixed axis 26. If the angle of the platform reference axis 32 relative to the platform rotation axis 30 is on the order of 2° degrees, for example, rotation of the platform through a 15° angle on its axis 30 will rotate or tilt the reference axis 32 only 0.5° relative to the fixed axis 26. This rotation of the reference axis may be caused to occur in a fixed plane containing the fixed axis by proper conjoint rotation of both the platform 16 and the rotor 14. Such high resolution rotation or tilting of the reference axis is advantageous since it permits the use of a relatively low resolution angle sensor or measuring device responsive to the large angle rotation of the platform 16 on its axis 30 to accurately indicate the small angle rotation of the reference axis.

What is claimed:

1. A rotary mount having a variable coning motion, comprising:
   a relatively stationary base for attachment to a support,
   a rotor mounted on said base for rotation on a fixed axis relative to said base,
   a rotary platform mounted on said rotor for rotation on an axis relative to said rotor,
   said axes being disposed at an acute angle relative to one another, and said platform having a reference axis disposed at an angle to said platform rotation axis, whereby said rotor and platform are selectively rotatable individually and in unison relative to one another and to said base to angularly displace said reference axis relative to said fixed axis through a range of skew angles and directions, and
   said platform including mounting surface means inclined at an oblique angle relative to said platform rotation axis for mounting an object on said platform in predetermined relationship to said reference axis, and
   drive means for selectively driving said rotor in rotation on said fixed axis relative to said base and said platform in rotation on said platform rotation axis relative to said rotor.

2. The subject matter of claim 1 wherein:
   said mounting surface means is normal to said fixed axis in one rotary position of said platform relative to said rotor.

3. The subject matter of claim 2 including:
   means for sensing and generating angle signals representing the relative angular positions of said base and rotor on said fixed axis and the relative angular positions of said rotor and platform on said platform rotation axis.

4. A rotary mount having a variable coning motion, comprising:
   a relatively stationary base for attachment to a support,
   a rotor mounted on said base for rotation on a fixed axis relative to said base,
   a rotary platform mounted on said rotor for rotation on an axis relative to said rotor,
   said base, rotor and platform being annular in cross section and disposed in interfitting relation one within the other,
   said base and rotor having first concentric wall portions and said rotor and platform having second concentric wall portions,
   said axes being disposed at an acute angle relative to one another, and said platform having a reference axis disposed at an angle to said platform rotation axis, whereby said rotor and platform are selectively rotatable individually and in unison relative to one another and to said base to angularly displace said reference axis relative to said fixed axis through a range of skew angles and directions,
   means for mounting an object on said platform in predetermined relationship to said reference axis, and
   drive means for selectively driving said rotor in rotation on said fixed axis relative to said base and said platform in rotation on said platform rotation axis relative to said rotor comprising a first electrical motor including relatively rotatable elements on said first concentric wall portions, respectively and a second electrical motor including relatively rotatable elements on said second concentric wall portions, respectively.

5. A rotary mount having a variable coning motion, comprising:
   a relatively stationary base for attachment to a support,
   a rotor mounted on said base for rotation on a fixed axis relative to said base,
   a rotary platform mounted on said rotor for rotation on an axis relative to said rotor,
   said axes being disposed at an acute angle relative to one another, and said platform having a reference axis disposed at an angle to said platform rotation axis, whereby said rotor and platform are selectively rotatable individually and in unison relative to one another and to said base to angularly displace said reference axis relative to said fixed axis through a range of skew angles and directions,
   means for mounting an object on said platform in predetermined relationship to said reference axis,
   drive means for selectively driving said rotor in rotation on said fixed axis relative to said base and said platform in rotation on said platform rotation axis relative to said rotor, and
   means for sensing and generating angle signals representing the relative angular positions of said base and rotor on said fixed axis and the relative angular positions of said rotor and platform on said patform rotation axis.

6. The subject matter of claim 5 wherein:
   said base and rotor have first concentric wall portions and said rotor and platform have second concentric wall portions, and
   said angle sensing and signal generating means comprises a first angle sensor having relatively rotatable elements on said first concentric wall portions, respectively, and a second angle sensor having relatively rotatable elements on said second concentric wall portions.

7. A rotary mount having a variable coning motion, comprising:
   a relatively stationary base for attachment to a support,
   a rotor mounted on said base for rotation on a fixed axis relative to said base,
   a rotary platform mounted on said rotor for rotation on an axis relative to said rotor,
   said base, rotor and platform being annular in cross section and disposed in interfitting relation one within the other,
   said base and rotor having first concentric wall portions and said rotor and platform having second concentric wall portions,
   said axes being disposed at an acute angle relative to one another, and said platform having a reference axis disposed at an angle to said platform rotation axis, whereby said rotor and platform are selectively rotatable individually and in unison relative to one another and to said base to angularly displace said reference axis relative to said fixed axis through a range of skew angles and directions,
   means for mounting an object on said platform in predetermined relationship to said reference axis, and
   drive means for selectively driving said rotor in rotation on said fixed axis relative to said base and said platform in rotation on said platform rotation axis relative to said rotor comprising a first electrical motor including relatively rotatable elements on said first concentric wall portions, respectively, and a second electrical motor including relatively rotatable elements on said second concentric wall portions, respectively,
   a first angle sensor having elements on concentric wall portions of said base and rotor for generating signals representing the angular position of said rotor relative to said base, and
   a second angle sensor having elements on concentric wall portions of said rotor and platform for generating signals representing the angular position of said platform relative to said rotor.

8. The subject matter of claim 7 wherein:
   said mounting means comprises a mounting surface on said platform in a plane which is normal to said fixed axis in one angular position of said platform relative to said rotor, and
   said reference axis is normal to said mounting surface so as to parallel said fixed axis in said one angular position of said platform.

9. A rotary mount having a variable coning motion, comprising:
   a relatively stationary generally cylindrical base for attachment to a support,
   a generally cylindrical rotor within said base,
   a generally cylindrical platform within said rotor,
   first bearing means mounting said rotor within said base for rotation on a fixed axis relative to said base,
   second bearing means mounting said platform within said rotor for rotation on a second axis relative to said rotor, said axes being disposed at an acute angle relative to one another, and said platform having a reference axis disposed at an angle to said platform rotation axis, whereby said rotor and platform are selectively rotatable relative to one another and to said base to angularly displace said reference axis relative to said fixed axis through a range of skew angles and directions, and means for mounting an object on said platform in predetermined relationship to said reference axis.

10. The subject matter of claim 9 including:

drive means for selectively driving said rotor in rotation on said fixed axes relative to said base and said platform in rotation on said platform rotation axis relative to said rotor.

11. The subject matter of claim 10 wherein:

said base and rotor have concentric wall portions and said rotor and platform have concentric wall portions, and said drive means comprises an electrical motor having relatively rotatable elements on concentric wall portions of said base and rotor for driving said rotor in rotation relative to said base and an electrical motor having relatively rotatable elements on concentric wall portions of said rotor and platform for driving said platform in rotation relative to said rotor.

12. The subject matter of claim 11 including means for sensing and generating angle signals representing the relative angular positions of said base and rotor on said fixed axis and the relative angular positions of said rotor and platform on said platform rotation axis.

13. The subject matter of claim 12 wherein:

said angle sensing and signal generating means comprises a first angle sensor having relatively rotatable elements on concentric wall portions of said base and rotor for generating angle signals representing the angle of said rotor relative to said base and a second angle sensor having relatively rotatable elements on concentric wall portions of said rotor and platform for generating angle signals representing the angle of said platform relative to said rotor.

14. The subject matter of claim 9 including means for sensing and generating angle signals representing the relative angular positions of said base and rotor on said fixed axis and the relative angular positions of said rotor and platform on said platform rotation axis.

15. The subject matter of claim 14 wherein:

said base and rotor have concentric wall portions and said rotor and platform have concentric wall portions, and said drive means comprises an electrical motor having relatively rotatable elements on concentric wall portions of said base and rotor for driving said rotor in rotation relative to said base and an electrical motor having relatively rotatable elements on concentric wall portions of said rotor and platform for driving said platform in rotation relative to said rotor.

16. The subject matter of claim 9 wherein:

said base and rotor have concentric wall portions and said rotor and platform have concentric wall portions, said drive means comprises an electrical motor including relatively rotatable elements on concentric wall portions of said base and rotor for driving said rotor in rotation on said fixed axis relative to said base and an electrical motor including relatively rotatable elements on concentric wall portions of said rotor and platform for driving said platform in rotation on said platform rotation axis relative to said rotor, a first angle sensor having elements on concentric wall portions of said base and rotor for generating signals representing the angular position of said rotor relative to said base, a second angle sensor having elements on concentric wall portions of said rotor and platform for generating signals representing the angular position of said platform relative to said rotor, said mounting means comprises a mounting surface on said platform in a plane which is normal to said fixed axis in one angular position of said platform relative to said rotor, and said reference axis is normal to said mounting surface so as to parallel said fixed axis in said one angular position of said platform.

* * * * *